(12) United States Patent
Pastoor et al.

(10) Patent No.: US 11,414,014 B2
(45) Date of Patent: Aug. 16, 2022

(54) INTERIOR REARVIEW MIRROR ASSEMBLY WITH CIRCUITRY AT MIRROR MOUNT

(71) Applicant: Magna Mirrors of America, Inc., Holland, MI (US)

(72) Inventors: Nathan J. Pastoor, Jenison, MI (US); John T. Uken, Jenison, MI (US)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 0 days.

(21) Appl. No.: 17/249,176

(22) Filed: Feb. 23, 2021

(65) Prior Publication Data

US 2021/0261056 A1    Aug. 26, 2021

Related U.S. Application Data

(60) Provisional application No. 62/980,462, filed on Feb. 24, 2020.

(51) Int. Cl.
*B60R 1/08* (2006.01)
*B60R 1/04* (2006.01)

(52) U.S. Cl.
CPC .............. *B60R 1/088* (2013.01); *B60R 1/04* (2013.01)

(58) Field of Classification Search
CPC .................................. B60R 1/04; B60R 1/088
USPC .................................................. 359/265, 839
See application file for complete search history.

(56) References Cited

U.S. PATENT DOCUMENTS

| | | |
|---|---|---|
| 4,712,879 A | 12/1987 | Lynam et al. |
| 4,826,289 A | 5/1989 | Vandenbrink et al. |
| 5,066,112 A | 11/1991 | Lynam et al. |
| 5,073,012 A | 12/1991 | Lynam |
| 5,076,673 A | 12/1991 | Lynam et al. |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,406,414 A | 4/1995 | O'Farrell et al. |
| 5,525,264 A | 6/1996 | Cronin et al. |
| 5,567,360 A | 10/1996 | Varaprasad et al. |
| 5,572,354 A * | 11/1996 | Desmond ............ F16C 11/0604 359/872 |
| 5,610,756 A | 3/1997 | Lynam et al. |
| 5,668,663 A | 9/1997 | Varaprasad et al. |

(Continued)

*Primary Examiner* — Ricky D Shafer
(74) *Attorney, Agent, or Firm* — Honigman LLP

(57) ABSTRACT

A vehicular interior rearview mirror assembly includes a mirror mount and a mirror head having a mirror casing and a mirror reflective element. The mirror reflective element is an electrically variable reflectance mirror reflective element including (i) a front glass substrate, (ii) a rear glass substrate, and (iii) an electro-optic medium established between the front glass substrate and the rear glass substrate. First and second electrically conductive terminals each have (i) a proximal end that is electrically connected to a respective electrically conductive coating at the respective glass substrate and (ii) a distal end that extends rearward from the rear side of the mirror reflective element. The distal ends, when the mirror reflective element is attached at the mirror casing, are disposed at a connector that is integrated with the mirror casing. An electrically conductive wire of the vehicle connects to the connector of the mirror casing.

30 Claims, 7 Drawing Sheets

(56) References Cited

U.S. PATENT DOCUMENTS

| | | | |
|---|---|---|---|
| 5,669,698 A * | 9/1997 | Veldman | B60R 1/1207 |
| | | | 362/241 |
| 5,724,187 A | 3/1998 | Varaprasad et al. | |
| 5,910,854 A | 6/1999 | Varaprasad et al. | |
| 5,971,553 A * | 10/1999 | Durnwald | B60R 1/04 |
| | | | 359/872 |
| 6,002,511 A | 12/1999 | Varaprasad et al. | |
| 6,154,306 A | 11/2000 | Varaprasad et al. | |
| 6,158,655 A * | 12/2000 | DeVries, Jr. | B60R 1/12 |
| | | | 235/462.43 |
| 6,178,034 B1 | 1/2001 | Allemand et al. | |
| 6,439,755 B1 | 8/2002 | Fant, Jr. et al. | |
| 6,501,387 B2 | 12/2002 | Skiver et al. | |
| 6,690,268 B2 | 2/2004 | Schofield et al. | |
| 7,184,190 B2 | 2/2007 | McCabe et al. | |
| 7,195,381 B2 | 3/2007 | Lynam et al. | |
| 7,249,860 B2 | 7/2007 | Kulas et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,338,177 B2 | 3/2008 | Lynam | |
| 7,360,932 B2 | 4/2008 | Uken et al. | |
| 7,626,749 B2 | 12/2009 | Baur et al. | |
| 7,657,052 B2 * | 2/2010 | Larson | H04R 3/00 |
| | | | 381/361 |
| 8,508,831 B2 | 8/2013 | De Wind et al. | |
| 8,730,553 B2 | 5/2014 | De Wind et al. | |
| 9,346,403 B2 | 5/2016 | Uken et al. | |
| 9,598,016 B2 | 3/2017 | Blank et al. | |
| 10,967,796 B2 * | 4/2021 | Uken | B60R 1/088 |
| 2005/0078389 A1 * | 4/2005 | Kulas | B60R 1/04 |
| | | | 359/877 |
| 2006/0061008 A1 | 3/2006 | Kamer et al. | |
| 2008/0310006 A1 * | 12/2008 | Kelley | B60R 1/02 |
| | | | 359/267 |
| 2009/0097097 A1 * | 4/2009 | Desmond | G02F 1/157 |
| | | | 359/267 |
| 2011/0096427 A1 * | 4/2011 | Uken | G02B 7/182 |
| | | | 359/872 |
| 2011/0141543 A1 * | 6/2011 | Uken | B60R 1/12 |
| | | | 359/267 |
| 2014/0313563 A1 * | 10/2014 | Uken | B60R 1/088 |
| | | | 359/267 |
| 2015/0097955 A1 | 4/2015 | De Wind et al. | |
| 2015/0334354 A1 | 11/2015 | Uken et al. | |
| 2018/0056871 A1 * | 3/2018 | Karner | H04N 7/181 |
| 2019/0047475 A1 | 2/2019 | Uken et al. | |

\* cited by examiner

INTERIOR REARVIEW MIRROR ASSEMBLY WITH CIRCUITRY AT MIRROR MOUNT

CROSS REFERENCE TO RELATED APPLICATION

The present application claims the filing benefits of U.S. provisional application Ser. No. 62/980,462, filed Feb. 24, 2020, which is hereby incorporated herein by reference in its entirety.

FIELD OF THE INVENTION

The present invention relates generally to the field of mirror elements for use in rearview mirror assemblies and visors for vehicles.

BACKGROUND OF THE INVENTION

It is known to provide a mirror reflective element and a bezel for an interior or exterior rearview mirror assembly of a vehicle. The interior mirror reflective element is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. Typically, and such as shown in FIG. 6, electrochromic mirror reflective elements have a circuit board disposed in the mirror head with an ambient light photosensor, a glare light photosensors and a drive circuit and associated circuitry disposed at the circuit board. The circuitry of the circuit board is electrically connected to the electrically conductive layers of the glass substrates via wires that may be soldered at respective connectors. A separate wire harness connector extends from the circuit board for electrically connecting to a wire harness of the vehicle.

SUMMARY OF THE INVENTION

The present invention provides an interior rearview mirror assembly that has an electrically variable reflectance mirror reflective element (such as an electro-optic mirror reflective element, such as an electrochromic mirror reflective element) adjustably mounted at an interior portion of a vehicle and adjustable to adjust the driver's rearward view, such as through a rear window of the vehicle, via the driver viewing the mirror reflective element. The interior rearview mirror assembly includes a reduced thickness or low profile mirror head pivotally mounted or attached at a mirror mount that is configured to attach at an interior portion of a vehicle equipped with the interior rearview mirror assembly. The mirror head comprises a reduced profile mirror casing and does not include a circuit board or EC drive circuitry therein. Electrical connection of a vehicle wire harness or connector is made to the electrically conductive coatings or layers at the surfaces of the glass substrates of the reflective element via connection at a connector integrated into the molded mirror housing, with the connector being electrically connected to terminals that are electrically connected (at the rear of the reflective element) to respective ones of the electrically conductive coatings at the second surface of the front glass substrate and at the third surface of the rear glass substrate.

These and other objects, advantages, purposes and features of the present invention will become apparent upon review of the following specification in conjunction with the drawings.

DESCRIPTION OF THE PREFERRED EMBODIMENTS

Figure 1:
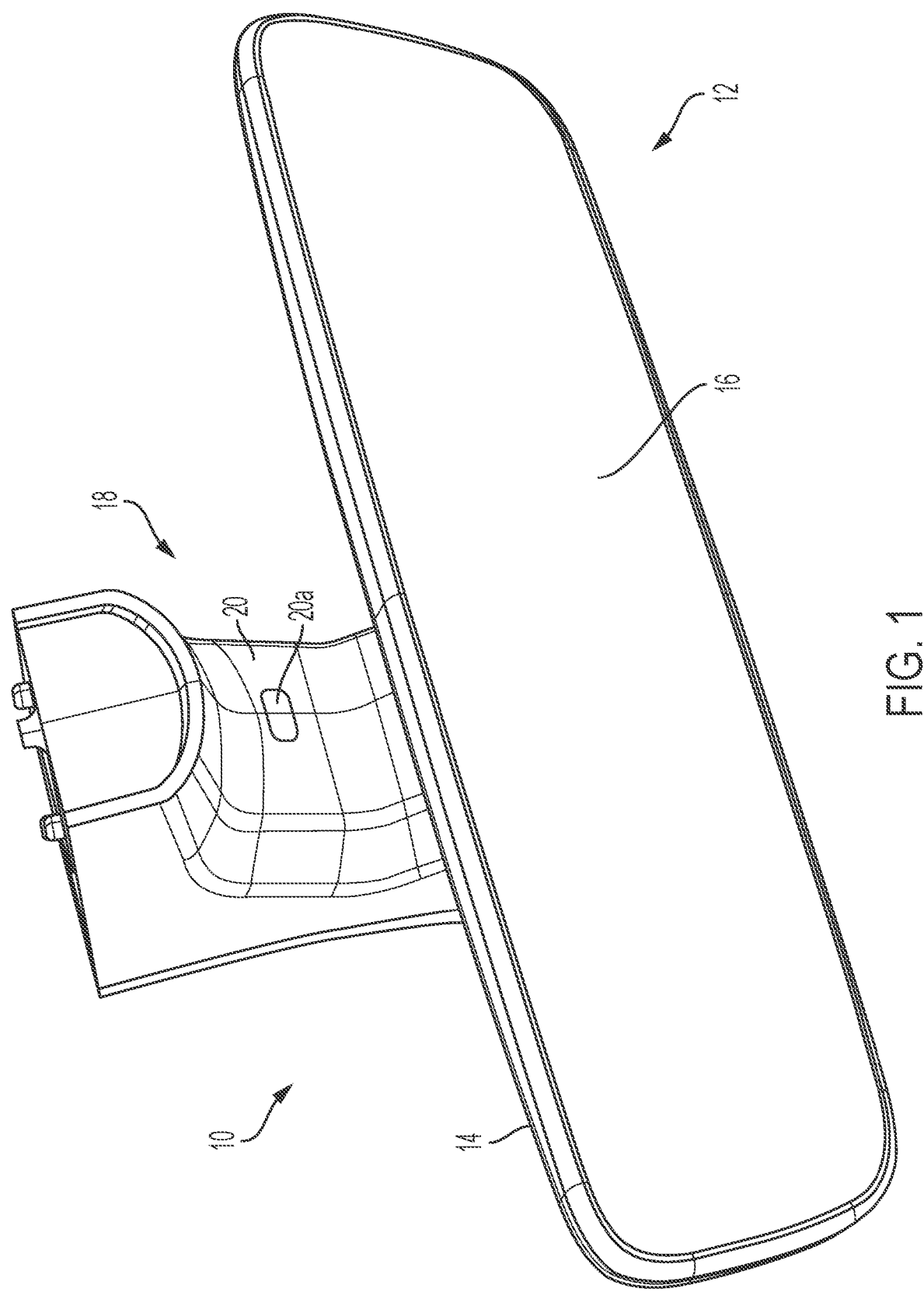
FIG. 1 is a perspective view of an interior rearview mirror assembly in accordance with the present invention.
Figure 1A:
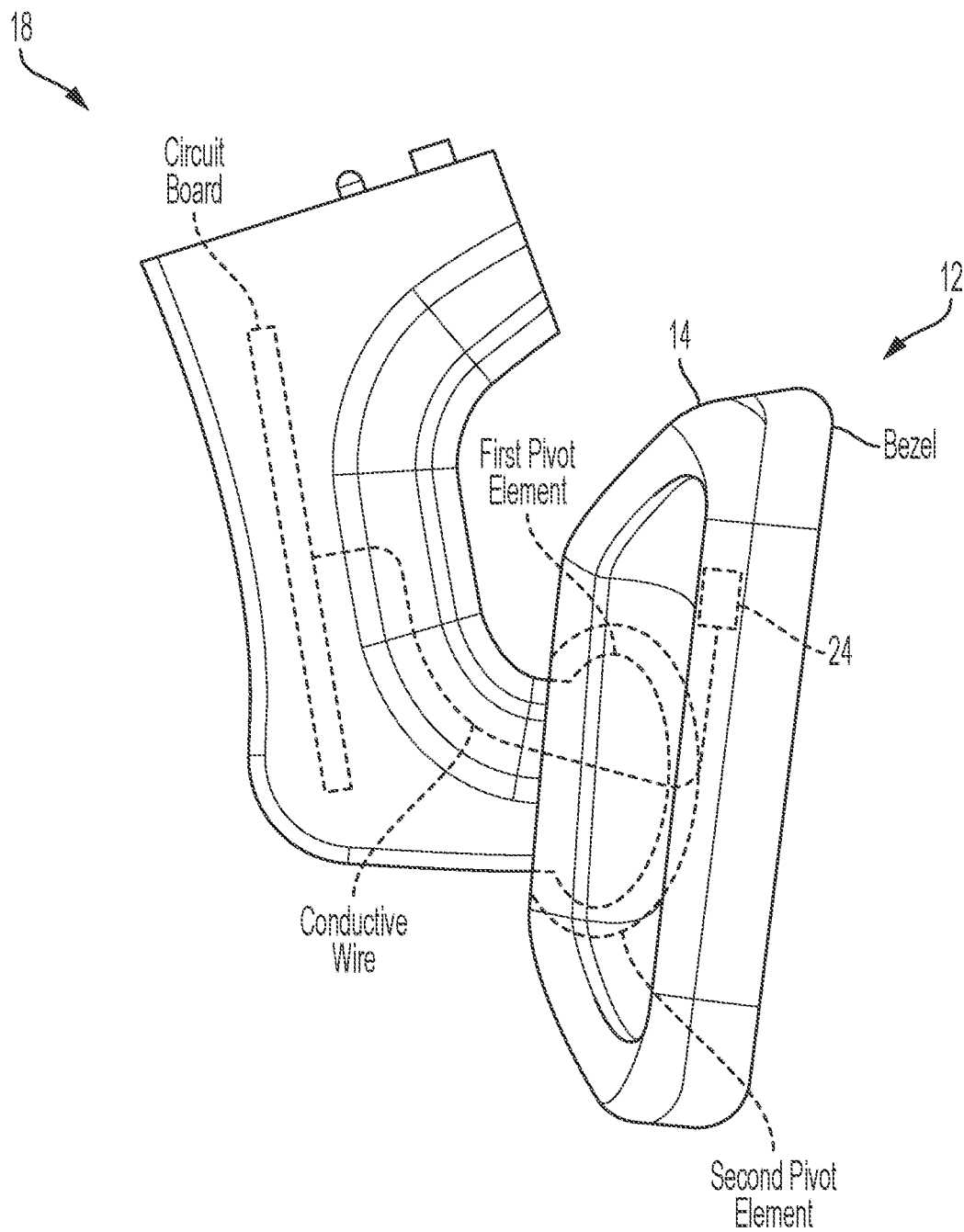

Referring now to the drawings and the illustrative embodiments depicted therein, an interior rearview mirror assembly 10 for a vehicle includes a mirror head 12 having a casing 14 and a reflective element 16 positioned at a front portion of the casing 14 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The mirror reflective element comprises a variable reflectance mirror reflective element that varies its reflectance responsive to electrical current applied to conductive coatings or layers of the reflective element.

The interior rearview mirror assembly of the present invention provides a thin or substantially reduced size mirror head or mirror casing, such as for an electro-optic (such as electrochromic or the like) reflective element. Thus, the mirror head of the present invention may have a reduced thickness dimension (the dimension between the front generally planar surface of the reflective element and the rear surface of the mirror casing at a generally central region of the mirror head), preferably less than about 25 mm, such as less than about 20 mm or less than about 15 mm or less than about 10 mm, and may have a casing that has radiused or tapered perimeter edge regions. The mirror assembly may utilize aspects of the mirror assemblies described in U.S. Publication Nos. US-2019-0047475 and/or US-2015-0334354, which are hereby incorporated herein by reference in their entireties.

The mirror head 12 is pivotally mounted at a mounting structure or stay 18, which is configured to mount at an interior structure of a vehicle (such as at a header of a vehicle or such as at a windshield of a vehicle) via an attaching structure. The mirror head 12 includes a pivot element (e.g., a socket) at the central rear portion of the mirror casing 14, while the mounting structure 18 includes a corresponding pivot element (e.g., a ball member), such that the socket pivotally receives the ball member to pivotally attach the mirror head at the mounting structure or stay.

The low profile mirror assembly 10 has circuitry or a circuit element or circuit board at or in the mounting arm or mounting structure or stay 18 of the mirror assembly (such as housed within a stay housing or casing 20), whereby a rearward viewing sensor or camera may be disposed in the housing 20 (and optionally a forward viewing sensor or camera may be disposed in the housing 20 for sensing forward of the mounting structure and through the windshield of the vehicle equipped with the mirror assembly). For example, a forward viewing sensor may be disposed at the circuit element and may view forwardly through a cover of the mounting structure or stay 18, such as through an aperture formed through the cover, and/or a rearward viewing sensor may be disposed at the circuit element and may view forwardly through the housing or casing 20 of the mounting structure or stay 18, such as through an aperture 20a formed through the housing 20 (FIG. 1). The circuitry may electrically connect to a wiring harness of the vehicle and may power the sensors. The circuitry also electrically connects to terminals of the electrochromic mirror reflective element or cell via one or more terminals disposed within the mirror head and accessible at the rear of the mirror casing.

Intelligent dimming of the mirror reflective element moves the photosensors from the mirror head, which were detecting ambient light and glare conditions, to either photosensors at the mirror mounting structure or to the rear backup camera or other cameras of the vehicle. As this eliminates the primary function of the printed circuit board (PCB) in the mirror head, the mirror head PCB and associated wiring can be eliminated from the mirror head. In order to provide power for the EC cell, single piece stampings or wire-forms can be utilized.

Figure 2:
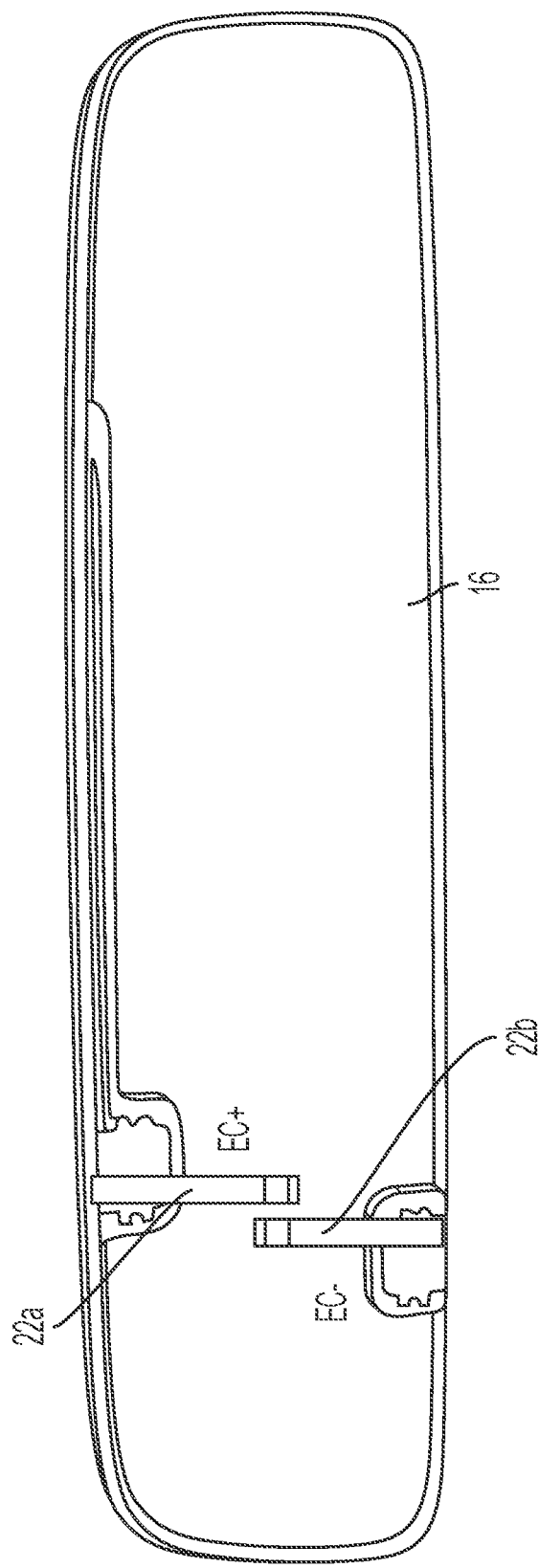
FIG. 2 is a rear side plan view of the mirror reflective element, showing the electrical connectors.
Figure 2A:
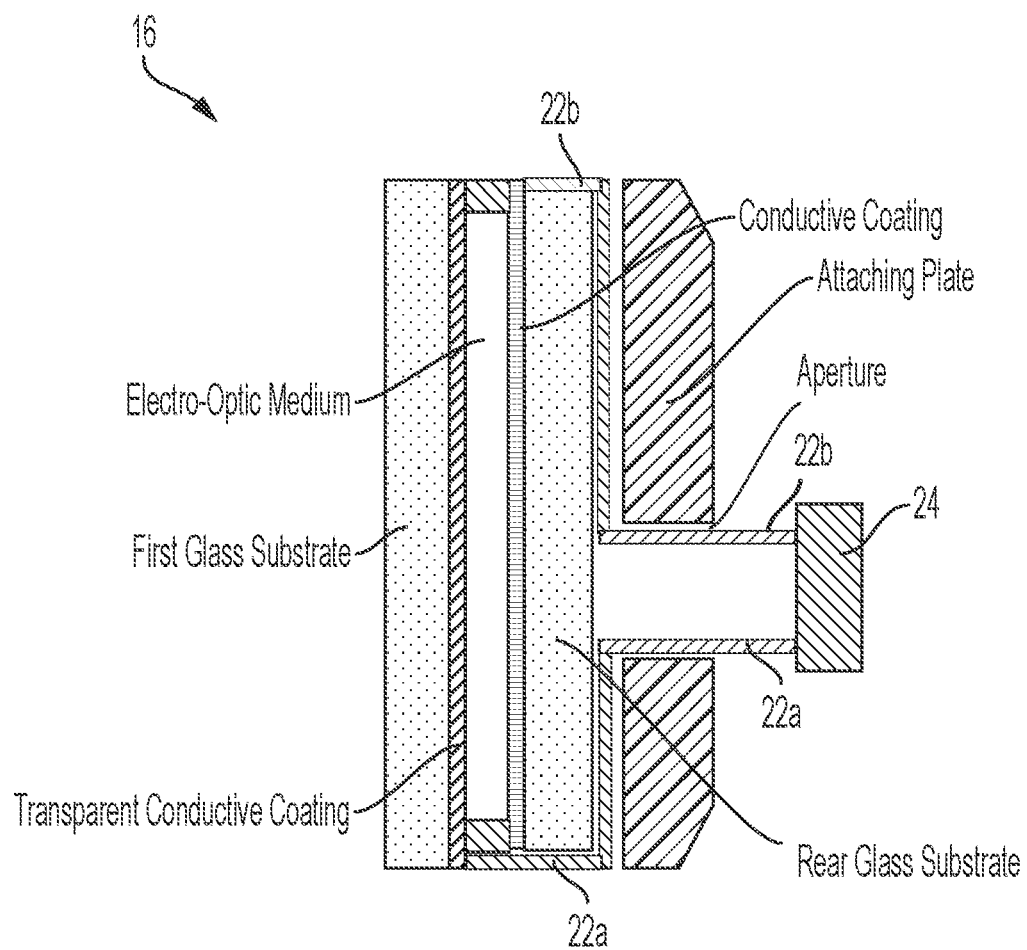

Electrical connection to the electro-optic reflective element may be made via electrically conductive elements 22a, 22b disposed at the rear of the reflective element 16 and in electrical connection with the respective electrically conductive coating at the second or rear surface of the front substrate or at the third or front surface of the rear substrate. As shown in FIG. 2, the electrically conductive elements 22a, 22b are disposed along the rear of the reflective element and extend inboard from a perimeter region where they conductive elements are soldered at the solder pads (with the solder pads being electrically conductively connected to the respective one of the transparent electrically conductive coating at the rear or second surface of the front glass substrate and the electrically conductive coating at the front or third surface of the rear glass substrate.

Figure 4:
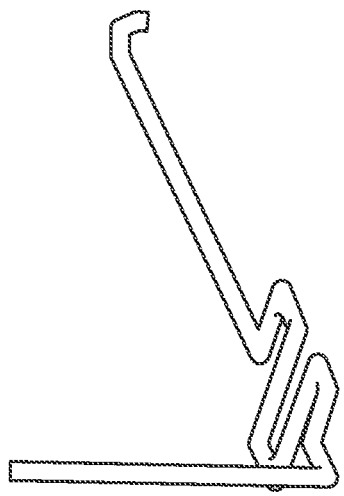
FIG. 4 is a perspective view of a wire-formed electrical connector for electrically connecting at the rear of the mirror reflective element.
Figure 5:
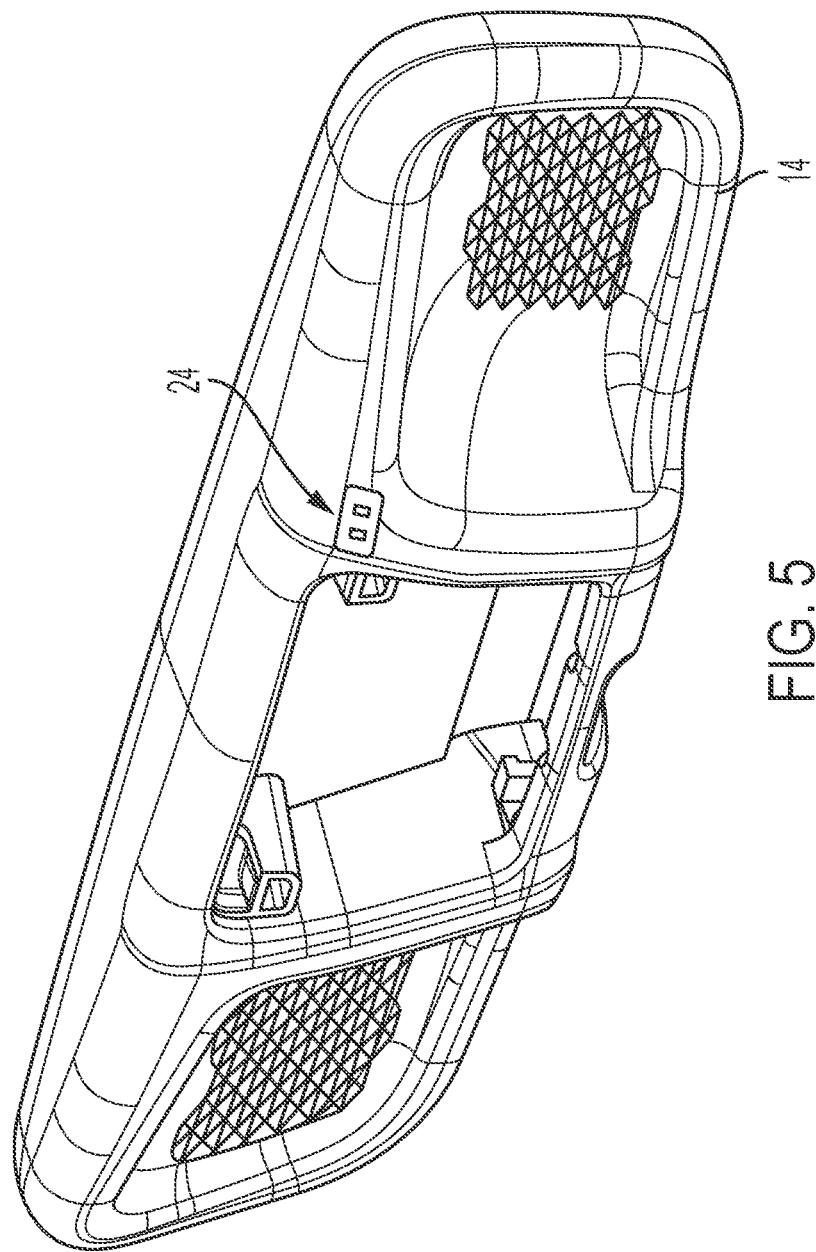
FIG. 5 is a rear perspective view of the mirror casing or housing, showing the integrated connector.
Figure 6:
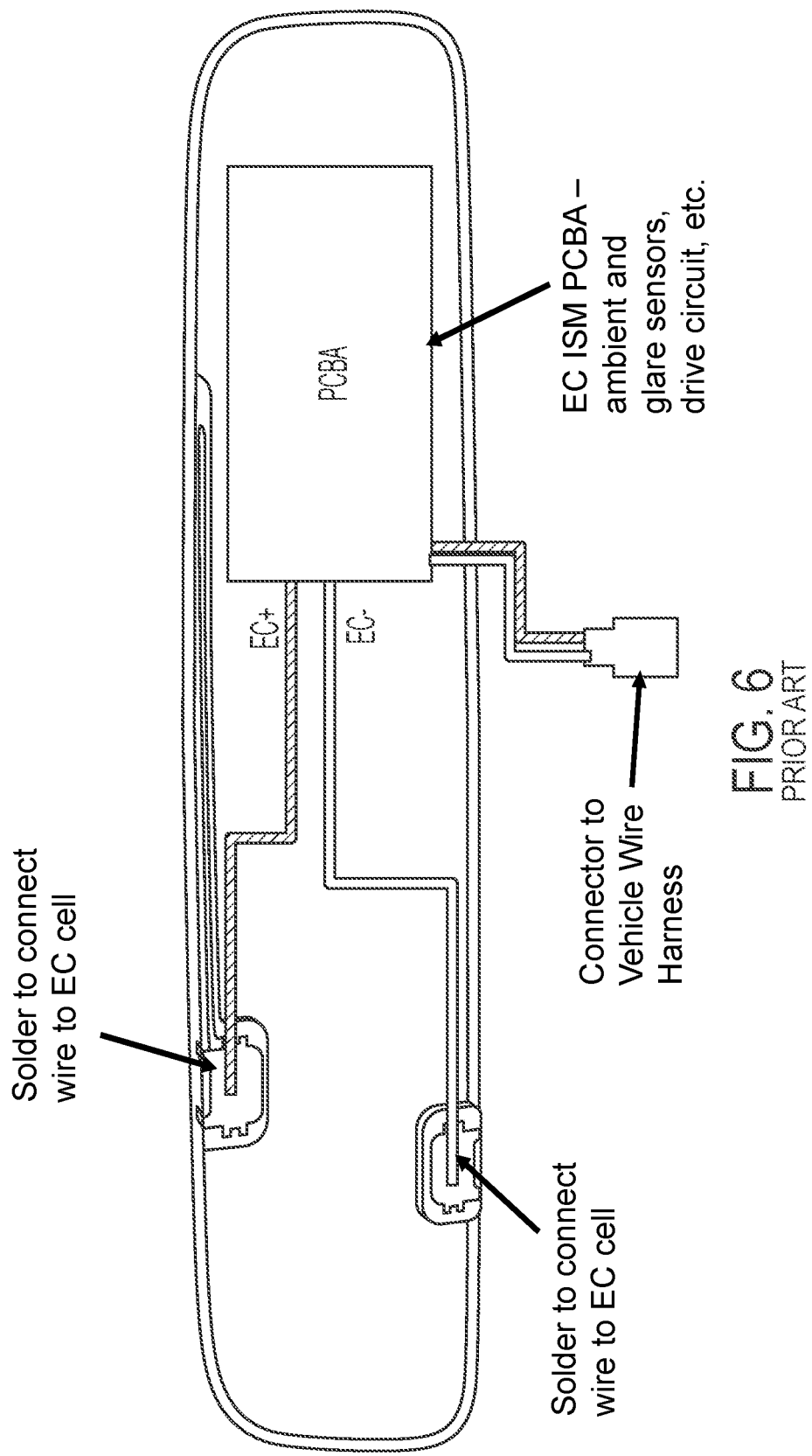
FIG. 6 is a rear side plan view of a typical mirror reflective element, with a circuit board disposed thereat.

The electrically conductive elements 22a, 22b may comprise stamped metallic terminals (FIG. 3) or may comprise wire formed terminals (FIG. 4). As shown in FIG. 5, the mirror casing 14 includes a connector 24 integrated into the molded housing. The ends of the terminals 22a, 22b extend or protrude rearward from the reflective element so as to be disposed at or received at the integrated connector 24 when the mirror reflective element is attached at the mirror casing or housing. A simple wire connector from the mounting base may then electrically connect to the integrated connector to power the EC cell. A separate connector to vehicle wiring harness is thus eliminated and replaced with a simple two-terminal connector that is integrated into the molded mirror housing, creating a more efficient design. As shown in FIG. 5, the rear of the mirror casing 14 may include a mount-attachment recess, where the pivot element may be snap-attached at the rear of the mirror casing to provide the desired pivot element (e.g., ball or socket) at the rear of the mirror casing.

Thus, the reflective element includes wires or a stamping or the like that interfaces directly with the electro-optic reflective element or cell solder tabs. The connector terminal side of the conductive elements may be disposed at an integrated connector portion of the housing (and may readily be positioned at or received at the integrated connector portion as the mirror reflective element is attached at or adhered at the mirror casing). The vehicle side connector or wire may connect to the connector terminals of the conductive elements at the integrated housing connector. The electrically conductive connectors may comprise a metal stamping or other suitable construction that provides sufficiently rigid or non-flexible portions that extend or protrude from the rear side of the mirror reflective element.

Figure 3:
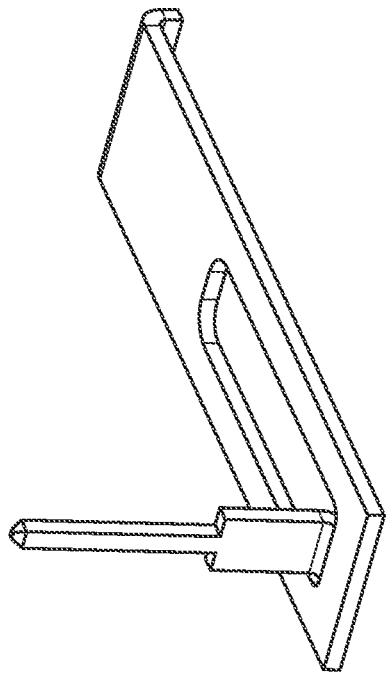
FIG. 3 is a perspective view of a stamped electrical connector for electrically connecting at the rear of the mirror reflective element.

In the illustrated embodiments, and such as shown in FIGS. 3 and 4, the electrically conductive terminals comprise (i) a body portion disposed along the fourth surface or rear side of the rear glass substrate, (ii) a proximal end that is bent relative to the body portion to extend at least partially across a thickness dimension of the rear glass substrate and to electrically connect to the transparent electrically conductive coating at the second surface of the front glass substrate or to the electrically conductive coating at the third surface of the rear glass substrate, and (ii) a distal end that is bent relative to the body portion to extend away from the fourth surface or rear side of the mirror reflective element. The distal ends are generally perpendicular to the rear side of the mirror reflective element so that, as the mirror reflective element is moved into attachment with the attaching plate at the mirror casing (or as the attaching plate, with the mirror reflective element already attached thereto and with the distal ends of the elements protruding therefrom, is attached at the mirror casing), the distal ends are connected to or inserted into or received in the connector portion at the mirror casing.

The electrically conductive terminals are sufficiently rigid or non-flexing or non-bending, so that the distal ends insert into and make electrical connection at the connector portion of the mirror casing when the mirror reflective element is attached at the mirror casing. The electrical connector portion of the mirror casing may comprise a pair of receiving terminals that receive the distal ends of the electrically conductive terminals at one end and that are configured to receive pins or terminals of the wire or harness at the other end (the other end being exposed at or accessible at the exterior side of the mirror casing). The terminals of the connector portion may be insert molded during the injection molding process that forms the mirror casing, or may be insert molded in a connector portion that snap attaches at an aperture of the mirror casing to integrate the connector portion as part of the mirror casing before the mirror reflective element is attached at the mirror casing.

The non-flexible construction of the electrically conductive connectors allows the protruding distal ends of the electrically conductive terminals to be inserted into or received in the connector portion of the mirror casing as the mirror reflective element is attached at the mirror casing (such as via adhesive attachment of the mirror reflective element at an attaching portion or plate of the mirror casing). The attaching portion or attaching plate at the mirror casing includes one or more apertures therethrough so that the protruding distal ends of the electrically conductive terminals pass through the aperture(s) when the mirror reflective element is attached at the attaching portion or attaching plate. The protruding distal portions may also plug into or insert into the connector of the mirror casing as the mirror reflective element is attached at the attaching portion or attaching plate, or may plug into or insert into the connector of the mirror casing when the attaching portion or plate is attached at the mirror casing (if the attaching portion or plate is formed as a separate part of the mirror casing and separately attached to the mirror casing via a separate process or step after the mirror reflective element is attached to the attaching portion or plate).

Thus, the circuit board (and associated electrochromic dimming circuitry) is disposed outside of the mirror head or reflective element assembly, and is mounted in the single ball mirror mounting structure or stay. Such a configuration eliminates a wiring harness that would extend from the stay to the mirror head (with the exception that two wires may be routed through the single ball for electrical connection to the electrochromic mirror reflective element or cell). The sensors view out from behind the stay cover or mount cover and through respective apertures in the cover. Optionally, one or both sensors or sensing functions (glare light sensing and ambient light sensing) may be integrated in a respective camera (such as a rearward viewing or rear backup camera).

The mirror housing or casing comprises a cover element that has side regions that are configured to attach at the rear of the reflective element, such that the reflective element may be adhesively attached directly to the mirror housing. The center region of the mirror housing may also provide an attaching surface at which the center region of the mirror reflective element is adhesively attached. The housing may partially receive the reflective element therein, such that a perimeter portion of the housing circumscribes the rear glass substrate of the electro-optic reflective element, with the front glass substrate having a rounded or curved perimeter edge to provide a rounded transition from a planar front or first surface of the reflective element to a side surface of the housing. Optionally, the housing may extend over and circumscribe the perimeter edge of the front substrate, whereby the housing may provide a rounded or curved perimeter region to provide a rounded transition from the planar front or first surface of the reflective element to the side surface of the housing.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037 and/or 7,360,932, which are hereby incorporated herein by reference in their entireties), or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges (such as by utilizing aspects of the mirror assemblies described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties, and with electrochromic and prismatic mirrors of such construction are commercially available from the assignee of this application under the trade name INFINITY™ mirror).

As discussed above, the mirror assembly comprises an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 8,503,061; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190; 7,255,451; 8,508,831 and/or 8,730,553, and/or U.S. Pat. Pub. No. US-2006-0061008, which are all hereby incorporated herein by reference in their entireties.

The mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:
    a mirror mount configured to attach at an interior portion of a vehicle equipped with the vehicular interior rearview mirror assembly, the mirror mount comprising a first pivot element;
    a mirror head comprising a mirror casing and a mirror reflective element attached at the mirror casing, the mirror head comprising a second pivot element;
    wherein the second pivot element pivotally attaches at the first pivot element forming a ball and socket joint to pivotally mount the mirror head at the mirror mount;
    wherein the mirror reflective element comprises an electrically variable reflectance mirror reflective element comprising (i) a front glass substrate having a first surface and a second surface with a transparent electrically conductive coating at the second surface, (ii) a rear glass substrate having a third surface and a fourth surface with an electrically conductive coating at the third surface, and (iii) an electro-optic medium disposed between and in contact with the transparent electrically conductive coating at the second surface of the front glass substrate and the electrically conductive coating at the third surface of the rear glass substrate;

a first electrically conductive terminal having (i) a proximal end that is electrically connected to the transparent electrically conductive coating at the second surface of the front glass substrate and (ii) a distal end that extends rearward from a rear side of the mirror reflective element;

a second electrically conductive terminal having (i) a proximal end that is electrically connected to the electrically conductive coating at the third surface of the rear glass substrate and (ii) a distal end that extends rearward from the rear side of the mirror reflective element;

wherein the first and second electrically conductive terminals extend from the rear side of the mirror reflective element so that the distal ends of the first and second electrically conductive terminals are disposed at a connector that is integrated with the mirror casing when the mirror reflective element is attached at the mirror casing; and wherein, with the mirror head pivotally mounted at the mirror mount at the interior portion of the vehicle, an electrically conductive wire connects to the connector of the mirror casing to electrically connect circuitry for controlling an electro-optic mirror dimming feature of the mirror reflective element to the transparent electrically conductive coating and the electrically conductive coating via the first and second electrically conductive terminals, respectively.

2. The vehicular interior rearview mirror assembly of claim 1, wherein the mirror head comprises a reduced profile mirror head having a side region thickness dimension spanning between a front planar surface of the mirror reflective element and a rear surface of a laterally sideward region of the mirror casing.

3. The vehicular interior rearview mirror assembly of claim 1, wherein the circuitry for controlling the electro-optic mirror dimming feature of the mirror reflective element is disposed in the mirror mount.

4. The vehicular interior rearview mirror assembly of claim 3, comprising a circuit board having circuitry associated with the electro-optic mirror dimming feature, wherein the circuit board is disposed in the mirror mount.

5. The vehicular interior rearview mirror assembly of claim 3, wherein the electrically conductive wire passes through the ball and socket joint to electrically connect the circuitry to the connector of the mirror casing.

6. The vehicular interior rearview mirror assembly of claim 1, wherein the proximal ends of the first and second electrically conductive terminals are soldered at the fourth surface of the rear glass substrate.

7. The vehicular interior rearview mirror assembly of claim 1, wherein the mirror reflective element is adhesively attached at a mirror attaching plate, and wherein the mirror attaching plate attaches at the mirror casing to attach the mirror reflective element at the mirror casing.

8. The vehicular interior rearview mirror assembly of claim 1, wherein the mirror casing comprises a bezel element, and wherein the mirror reflective element is attached at the bezel element.

9. The vehicular interior rearview mirror assembly of claim 1, wherein the mirror casing comprises an attaching surface, and wherein the mirror reflective element is adhesively attached at the attaching surface of the mirror casing.

10. The vehicular interior rearview mirror assembly of claim 1, wherein the proximal end of the first electrically conductive terminal is at a perimeter edge region of the rear glass substrate that is opposite from a perimeter edge region at which the proximal end of the second electrically conductive terminal is disposed.

11. The vehicular interior rearview mirror assembly of claim 10, wherein the first and second electrically conductive terminals extend from the respective perimeter edge regions of the rear glass substrate and partially across the fourth surface of the rear glass substrate to position the distal ends of the first and second electrically conductive terminals adjacent one another.

12. The vehicular interior rearview mirror assembly of claim 11, wherein one of the perimeter edge regions is at an upper perimeter edge of the rear glass substrate and the other of the perimeter edge regions is at a lower perimeter edge of the rear glass substrate.

13. The vehicular interior rearview mirror assembly of claim 11, wherein the distal ends of the first and second electrically conductive terminals are disposed at a central region of the rear glass substrate between the perimeter edge regions.

14. The vehicular interior rearview mirror assembly of claim 1, wherein the first electrically conductive terminal comprises a stamped metal terminal having a body portion that is disposed along the fourth surface, and wherein the proximal end of the first electrically conductive terminal is bent relative to the body portion to extend at least partially across a thickness dimension of the rear glass substrate, and wherein the distal end of the first electrically conductive terminal is bent relative to the body portion to extend away from the fourth surface of the rear glass substrate toward the connector that is integrated within the mirror casing, and wherein the second electrically conductive terminal comprises a stamped metal terminal having a body portion that is disposed along the fourth surface, and wherein the proximal end of the second electrically conductive terminal is bent relative to the body portion to extend at least partially across a thickness dimension of the rear glass substrate, and wherein the distal end of the second electrically conductive terminal is bent relative to the body portion to extend away from the fourth surface of the rear glass substrate toward the connector that is integrated within the mirror casing.

15. The vehicular interior rearview mirror assembly of claim 14, wherein the proximal end of the first electrically conductive terminal is at a perimeter edge region of the rear glass substrate that is opposite from a perimeter edge region at which the proximal end of the second electrically conductive terminal is disposed.

16. The vehicular interior rearview mirror assembly of claim 15, wherein the body portions of the first and second electrically conductive terminals extend from the respective perimeter edge regions of the rear glass substrate and partially across the fourth surface of the rear glass substrate to position the distal ends of the first and second electrically conductive terminals adjacent one another.

17. A vehicular interior rearview mirror assembly, the vehicular interior rearview mirror assembly comprising:

a mirror mount configured to attach at an interior portion of a vehicle equipped with the vehicular interior rearview mirror assembly, the mirror mount comprising a first pivot element;

a mirror head comprising a mirror casing and a mirror reflective element attached at the mirror casing, the mirror head comprising a second pivot element;

wherein the second pivot element pivotally attaches at the first pivot element forming a ball and socket joint to pivotally mount the mirror head at the mirror mount;

wherein the mirror reflective element comprises an electrically variable reflectance mirror reflective element comprising (i) a front glass substrate having a first surface and a second surface with a transparent electrically conductive coating at the second surface, (ii) a rear glass substrate having a third surface and a fourth surface with an electrically conductive coating at the third surface, and (iii) an electro-optic medium disposed between and in contact with the transparent electrically conductive coating at the second surface of the front glass substrate and the electrically conductive coating at the third surface of the rear glass substrate;

a first electrically conductive terminal having (i) a proximal end that is electrically connected to the transparent electrically conductive coating at the second surface of the front glass substrate and (ii) a distal end that extends rearward from the fourth surface of the mirror reflective element;

wherein the first electrically conductive terminal comprises a metal terminal having a body portion that is disposed along the fourth surface, and wherein the proximal end of the first electrically conductive terminal is bent relative to the body portion to extend at least partially across a thickness dimension of the rear glass substrate, and wherein the distal end of the first electrically conductive terminal is bent relative to the body portion to extend away from the fourth surface of the rear glass substrate toward a connector that is integrated within the mirror casing;

a second electrically conductive terminal having (i) a proximal end that is electrically connected to the electrically conductive coating at the third surface of the rear glass substrate and (ii) a distal end that extends rearward from the fourth surface of the mirror reflective element;

wherein the second electrically conductive terminal comprises a metal terminal having a body portion that is disposed along the fourth surface, and wherein the proximal end of the second electrically conductive terminal is bent relative to the body portion to extend at least partially across a thickness dimension of the rear glass substrate, and wherein the distal end of the second electrically conductive terminal is bent relative to the body portion to extend away from the fourth surface of the rear glass substrate toward the connector that is integrated within the mirror casing;

wherein the first and second electrically conductive terminals comprise respective extending portions that extend from and are perpendicular to the fourth surface of the mirror reflective element so that the distal ends of the first and second electrically conductive terminals are received at the connector that is integrated with the mirror casing when the mirror reflective element is attached at the mirror casing; and wherein, with the mirror head pivotally mounted at the mirror mount at the interior portion of the vehicle, an electrically conductive wire connects to the connector of the mirror casing to electrically connect circuitry for controlling an electro-optic mirror dimming feature of the mirror reflective element to the transparent electrically conductive coating and the electrically conductive coating via the first and second electrically conductive terminals, respectively.

18. The vehicular interior rearview mirror assembly of claim 17, wherein the circuitry for controlling the electro-optic mirror dimming feature of the mirror reflective element is disposed in the mirror mount.

19. The vehicular interior rearview mirror assembly of claim 17, wherein the mirror reflective element is adhesively attached at a mirror attaching plate, and wherein the mirror attaching plate attaches at the mirror casing to attach the mirror reflective element at the mirror casing.

20. The vehicular interior rearview mirror assembly of claim 17, wherein the mirror casing comprises a bezel element, and wherein the mirror reflective element is attached at the bezel element.

21. The vehicular interior rearview mirror assembly of claim 17, wherein the mirror casing comprises an attaching surface, and wherein the mirror reflective element is adhesively attached at the attaching surface of the mirror casing, and wherein the extending portions of the first and second electrically conductive terminals pass through an aperture of the attaching surface when the mirror reflective element is adhesively attached at the attaching surface.

22. The vehicular interior rearview mirror assembly of claim 17, wherein the proximal end of the first electrically conductive terminal is at a perimeter edge region of the rear glass substrate that is opposite from a perimeter edge region at which the proximal end of the second electrically conductive terminal is disposed.

23. The vehicular interior rearview mirror assembly of claim 22, wherein the body portions of the first and second electrically conductive terminals extend from the respective perimeter edge regions of the rear glass substrate and partially across the fourth surface of the rear glass substrate to position the distal ends of the first and second electrically conductive terminals adjacent one another.

24. A method for manufacturing a vehicular interior rearview mirror assembly, the method comprising:

providing a mirror mount configured to attach at an interior portion of a vehicle equipped with the vehicular interior rearview mirror assembly, the mirror mount comprising a first pivot element;

providing a mirror head comprising a mirror casing and a mirror reflective element attached at the mirror casing, the mirror head comprising a second pivot element;

wherein the mirror reflective element comprises an electrically variable reflectance mirror reflective element comprising (i) a front glass substrate having a first surface and a second surface with a transparent electrically conductive coating at the second surface, (ii) a rear glass substrate having a third surface and a fourth surface with an electrically conductive coating at the third surface, and (iii) an electro-optic medium disposed between and in contact with the transparent electrically conductive coating at the second surface of the front glass substrate and the electrically conductive coating at the third surface of the rear glass substrate;

disposing a first electrically conductive terminal at the mirror reflective element so that (i) a first body portion of the first electrically conductive terminal is disposed along the fourth surface of the rear glass substrate, (ii) a first proximal end of the first electrically conductive terminal is bent relative to the first body portion to extend at least partially across a thickness dimension of the rear glass substrate and to electrically connect to the transparent electrically conductive coating at the second surface of the front glass substrate, and (ii) a first distal end of the first electrically conductive terminal is bent relative to the first body portion to extend away from the fourth surface of the mirror reflective element;

disposing a second electrically conductive terminal at the mirror reflective element so that (i) a second body portion of the second electrically conductive terminal is disposed along the fourth surface of the rear glass substrate, (ii) a second proximal end of the second electrically conductive terminal is bent relative to the second body portion to extend at least partially across a thickness dimension of the rear glass substrate and to electrically connect to the electrically conductive coating at the third surface of the rear glass substrate, and (ii) a second distal end of the second electrically conductive terminal is bent relative to the second body portion to extend away from the fourth surface of the mirror reflective element;

attaching the mirror reflective element at the mirror casing;

wherein, as the mirror reflective element is attached at the mirror casing, the first and second distal ends of the first and second electrically conductive terminals are received at a connector that is integrated with the mirror casing;

pivotally attaching the second pivot element at the first pivot element forming a ball and socket joint to pivotally mount the mirror head at the mirror mount; and wherein, with the mirror head pivotally mounted at the mirror mount and with the mirror mount attached at the interior portion of the vehicle, electrically connecting an electrically conductive wire to the connector of the mirror casing to electrically connect circuitry for controlling an electro-optic mirror dimming feature of the mirror reflective element to the transparent electrically conductive coating and the electrically conductive coating via the first and second electrically conductive terminals, respectively.

25. The method of claim 24, wherein the circuitry for controlling the electro-optic mirror dimming feature of the mirror reflective element is disposed in the mirror mount.

26. The method of claim 24, wherein attaching the mirror reflective element at the mirror casing comprises adhesively attaching the mirror reflective element at a mirror attaching plate and attaching the mirror attaching plate at the mirror casing, and wherein the extending portions of the first and second electrically conductive terminals pass through an aperture of the attaching plate when the mirror reflective element is adhesively attached at the attaching plate.

27. The method of claim 24, wherein the mirror casing comprises an attaching surface, and wherein attaching the mirror reflective element at the mirror casing comprises adhesively attaching the mirror reflective element at the attaching surface of the mirror casing, and wherein the extending portions of the first and second electrically conductive terminals pass through an aperture of the attaching surface when the mirror reflective element is adhesively attached at the attaching surface.

28. The method of claim 24, wherein the first proximal end of the first electrically conductive terminal is at a perimeter edge region of the rear glass substrate that is opposite from a perimeter edge region at which the second proximal end of the second electrically conductive terminal is disposed.

29. The method of claim 28, wherein the first and second distal ends of the first and second electrically conductive terminals are disposed at a central region of the rear glass substrate between the perimeter edge regions.

30. The method of claim 28, wherein the first and second body portions of the first and second electrically conductive terminals extend from the respective perimeter edge regions of the rear glass substrate and partially across the fourth surface of the rear glass substrate to position the distal ends of the first and second electrically conductive terminals adjacent one another.

* * * * *